(12) United States Patent
Olander

(10) Patent No.: US 9,326,450 B2
(45) Date of Patent: May 3, 2016

(54) BALER ACCUMULATION WINDGUARD

(71) Applicant: AGCO CORPORATION, Duluth, GA (US)

(72) Inventor: Brian Olander, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 110 days.

(21) Appl. No.: 14/365,878

(22) PCT Filed: Dec. 17, 2012

(86) PCT No.: PCT/US2012/069986
§ 371 (c)(1),
(2) Date: Jun. 16, 2014

(87) PCT Pub. No.: WO2013/090874
PCT Pub. Date: Jun. 20, 2013

(65) Prior Publication Data
US 2014/0345244 A1  Nov. 27, 2014

Related U.S. Application Data

(60) Provisional application No. 61/576,027, filed on Dec. 15, 2011.

(51) Int. Cl.
*A01D 43/00* (2006.01)
*A01F 15/08* (2006.01)
*A01F 15/10* (2006.01)

(52) U.S. Cl.
CPC .............. *A01F 15/08* (2013.01); *A01D 43/006* (2013.01); *A01F 15/10* (2013.01); *A01F 15/106* (2013.01)

(58) Field of Classification Search
CPC ..... A01D 43/006; A01D 75/20; A01D 89/00; A01D 34/828; A01D 41/1252; A01D 89/008; A01F 12/54
USPC ..................................................... 56/190, 341
See application file for complete search history.

(56) References Cited

U.S. PATENT DOCUMENTS

| | | | | |
|---|---|---|---|---|
| 2,524,233 A * | 10/1950 | Russell | ................ | A01D 89/00 100/100 |
| 2,661,493 A * | 12/1953 | Joy | ...................... | E01H 1/0836 15/350 |
| 2,775,089 A * | 12/1956 | Russell | ................ | A01D 89/00 56/192 |
| 3,109,273 A * | 11/1963 | Fritz | ...................... | A01D 75/20 296/105 |
| 3,112,597 A * | 12/1963 | Heth | ................... | A01D 43/063 15/79.2 |
| 4,516,389 A | 5/1985 | Core | | |
| 4,597,203 A * | 7/1986 | Middleton | ............. | A01D 42/08 15/328 |
| 4,686,820 A * | 8/1987 | Andra | ................. | A01F 15/0833 100/88 |
| 5,131,214 A * | 7/1992 | Vermeer | ............ | A01F 15/0833 100/88 |

(Continued)

OTHER PUBLICATIONS

International Searching Authority, International Search Report for PCT Application PCT/US2012/069986, mailed May 4, 2013.

*Primary Examiner* — Árpád Fábián-Kovács

(57) ABSTRACT

An accumulation windguard includes non-porous sidewalls and a porous cover that extend about an accumulation area of a baler. The sidewalls deflect transverse airflow across the accumulation area and the cover allows for longitudinal airflow. Openings in the cover may be sized to deflect crop material to the accumulation area during the passage of airflow therethrough.

8 Claims, 7 Drawing Sheets

(56) References Cited

U.S. PATENT DOCUMENTS

| | | | | |
|---|---|---|---|---|
| 5,279,100 A * | 1/1994 | Pruitt | ............... | A01D 75/20 160/349.1 |
| 6,022,038 A * | 2/2000 | Maxwell | ............... | B60P 3/36 280/507 |
| 6,295,797 B1 * | 10/2001 | Naaktgeboren | ...... | A01D 89/008 56/341 |
| 7,469,525 B2 * | 12/2008 | Zeigler | ............... | A01D 34/828 56/320.1 |
| 7,690,974 B2 * | 4/2010 | Johnson | ............... | A01D 75/00 280/507 |
| 8,677,724 B2 * | 3/2014 | Chaney | ............... | A01F 15/0833 56/341 |
| 2002/0073670 A1 * | 6/2002 | Nieschulze | ............ | A01D 75/00 56/1 |
| 2011/0023435 A1 | 2/2011 | Matousek et al. | | |
| 2011/0023442 A1 * | 2/2011 | Herron | ............... | A01F 15/0825 56/341 |
| 2011/0165922 A1 * | 7/2011 | Farley | ............... | A01D 41/1243 460/111 |
| 2013/0298516 A1 * | 11/2013 | Houston | ............... | A01D 41/12 56/207 |

* cited by examiner

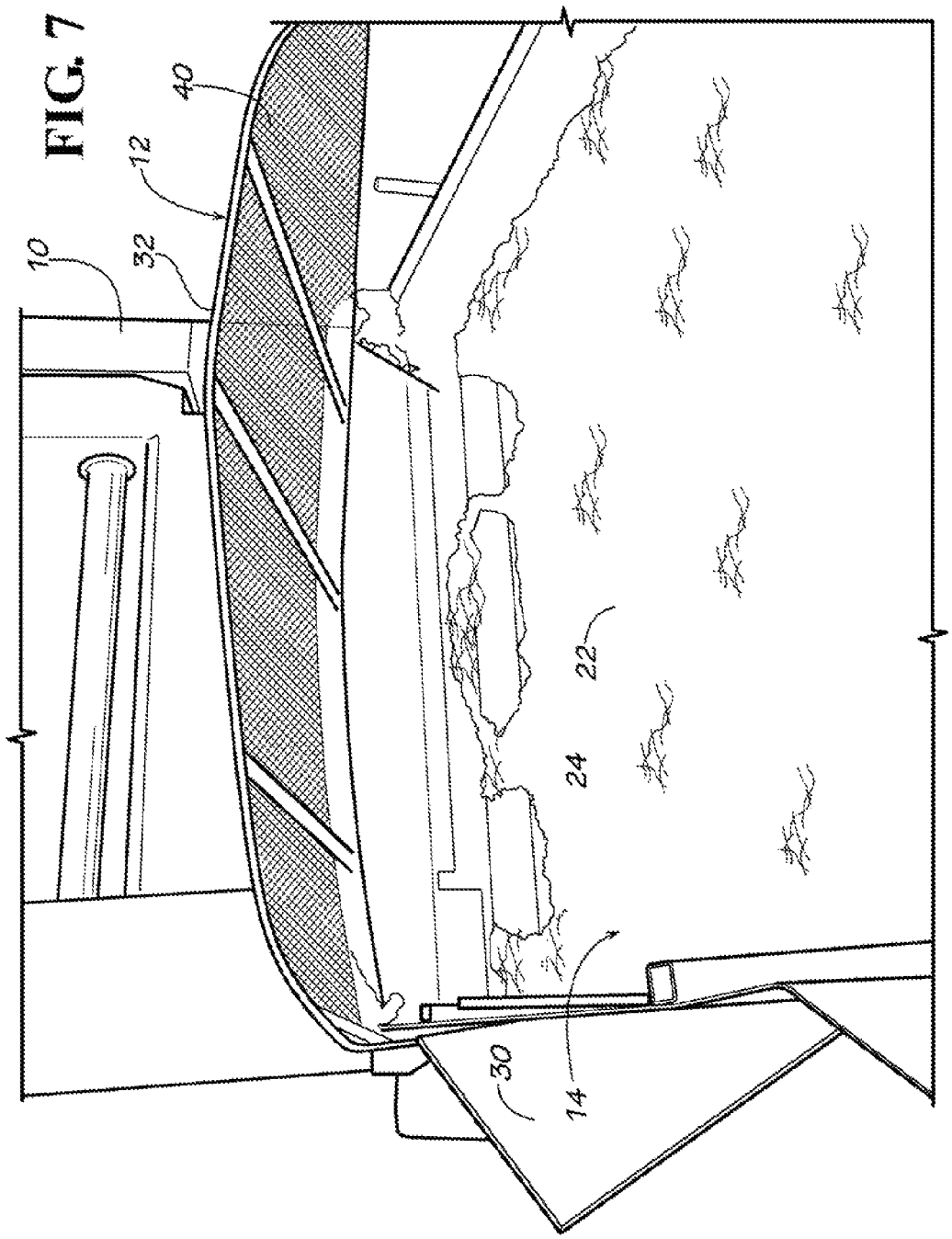

BALER ACCUMULATION WINDGUARD

TECHNICAL FIELD

This invention relates to balers, and more particularly, to balers having an accumulation area for accumulating crop material.

BACKGROUND

Continuous balers may accumulate crop material in an accumulation area prior to feeding the crop material into a baling chamber. Problems can arise in the transfer of crop material from a combine or other source to the accumulation area. For example, airflow through the accumulation area can adversely affect the accumulation and storage of crop material prior to its entry into the baler. A combine chopper generates significant airflow that can result in crop material, including material other than grain (MOG), being blown off the accumulation area, or never settling properly on the accumulation area. In addition, strong cross winds can blow accumulated material to one side of the accumulation area, resulting in lopsided bales.

BRIEF DESCRIPTION OF THE DRAWINGS

FIG. 7 shows an example embodiment of an accumulation windguard showing accumulated material on a conveyor.

OVERVIEW

Figure 1:
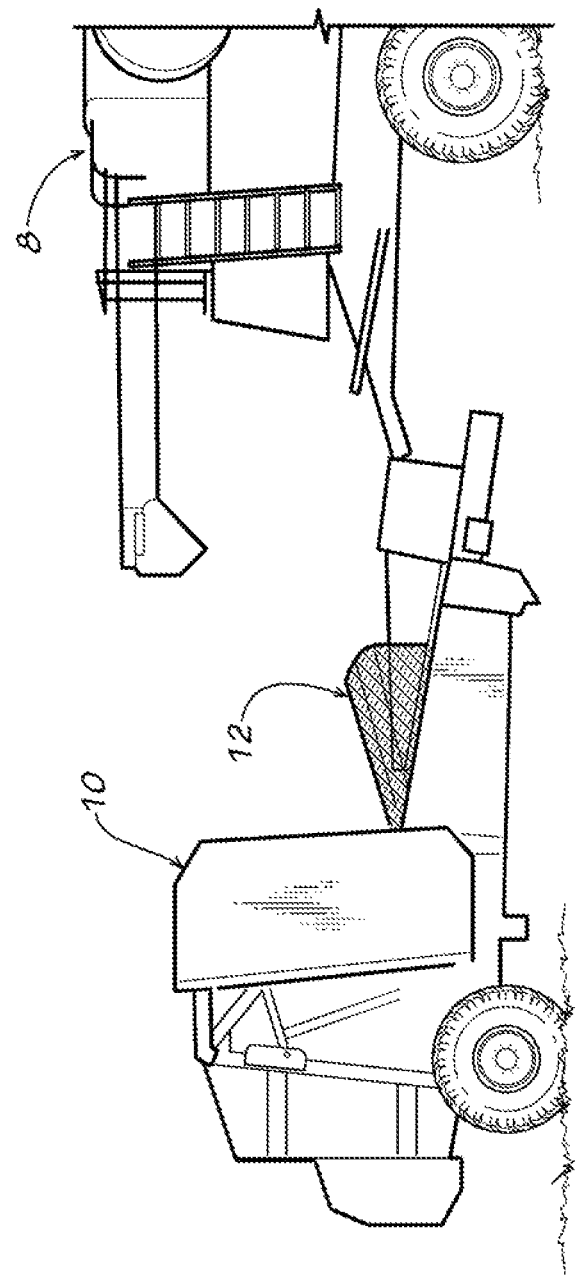
FIG. 1 shows an example embodiment of a round baler having an accumulation windguard.

In an example embodiment, an accumulation windguard manages airflow about an accumulation area. An example windguard can include structure to limit transverse air flow across an accumulation area to prevent disturbance of accumulated material while allowing longitudinal airflow across the accumulation region to guide the crop material to the accumulation area. In addition, structure may be provided to deflect airborne crop material to the accumulation area.

In an example embodiment, the windguard comprises two spaced-apart non-porous deflectors and a porous cover. The non-porous deflectors may be provided along an accumulation area of an accumulation conveyor in the form of sidewalls. The sidewalls may extend longitudinally along the lateral edges of the conveyor to restrict transverse airflow across the accumulation area. For example, the sidewalls may be arranged to deflect cross winds (winds moving transverse to the feed direction of the crop material into the baler) to prevent the cross winds from urging the accumulated crop material to a side of the accumulation area. This allows the crop material to accumulate and remain in a more evenly distributed pattern across the width of the conveyor leading to a more uniform bale.

The porous cover may extend across and over the accumulation region between the sidewalls. The porous nature of the cover allows for longitudinal airflow to pass through. Openings of the cover may be sized such that crop material projected above the accumulation area is deflected to the accumulation area while allowing airflow through the cover. This prevents airflow from a combine from pushing crop material beyond the accumulation area and prevents the adverse effects on the accumulated material that may occur if a non-porous cover were used which blocked the longitudinal airflow. The cover may extend upward from the sidewalls and serve as a deflector to deflect crop material downward to the accumulation region. For example, crop material may be projected to the accumulation region by a combine or other means in which the crop material is airborne and associated with a longitudinally rearward airflow. The cover can allow airflow to urge crop material rearward to the accumulation area, and can also deflect airborne material toward the accumulation area to prevent its escape. The forward end of the sidewalls and cover may thus serve as a mouth for receiving rearwardly projected crop material and airflow. For example, crop material may be projected rearwardly onto the conveyor through the mouth and guided to the accumulation area where it may be fed into the baler via the conveyor. For example, when crop material is provided from a combine, the windguard allows airflow from a combine chopper pulling the baler to flow through the accumulation area and through the mesh of the cover while deflecting MOG carried by the airflow onto the accumulation area. This arrangement thus directs airflow over the accumulation region longitudinally while minimizing transverse air flow.

DESCRIPTION OF EXAMPLE EMBODIMENTS

Figure 2:
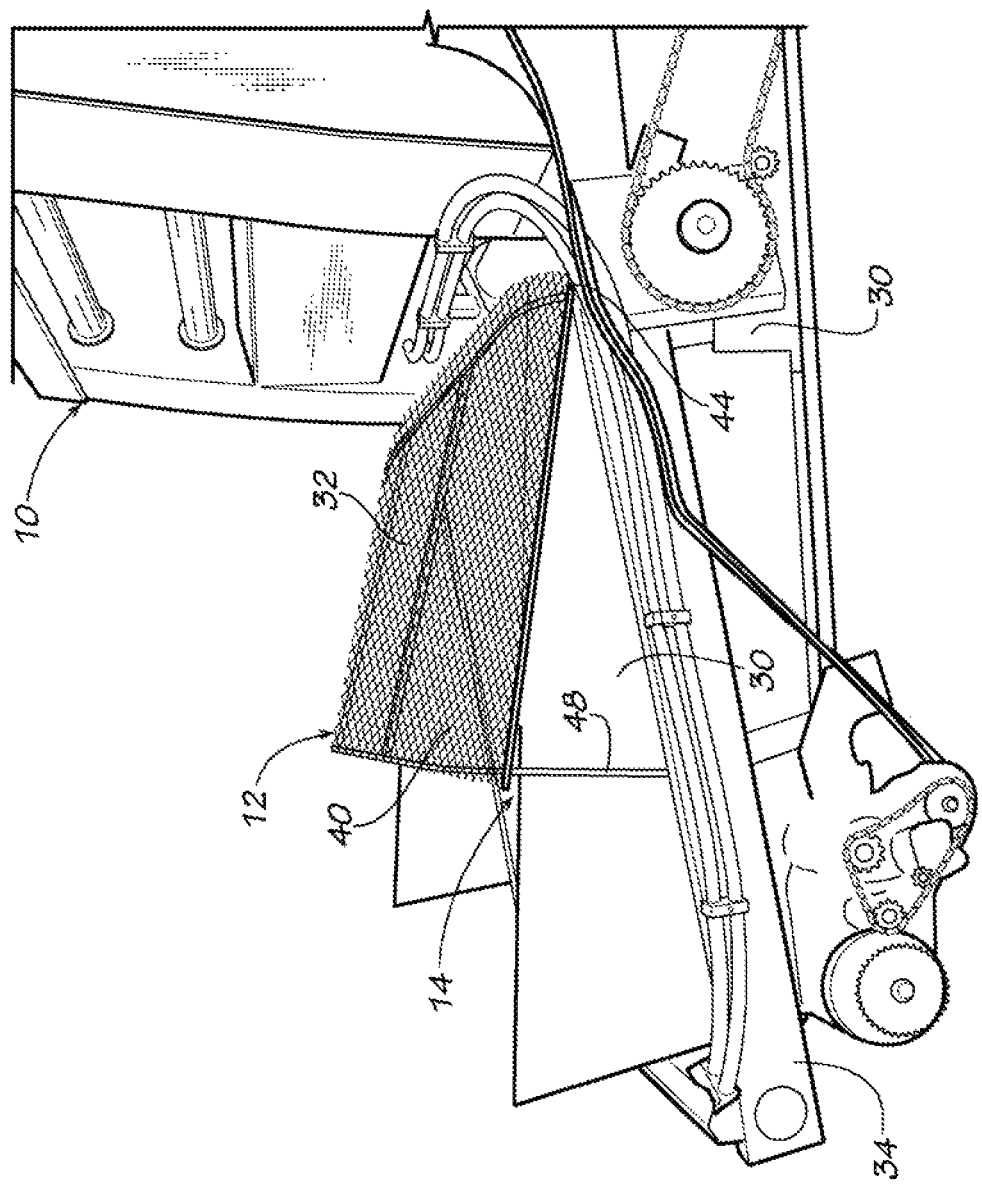
FIG. 2 shows a side view of an accumulation windguard.
Figure 3:
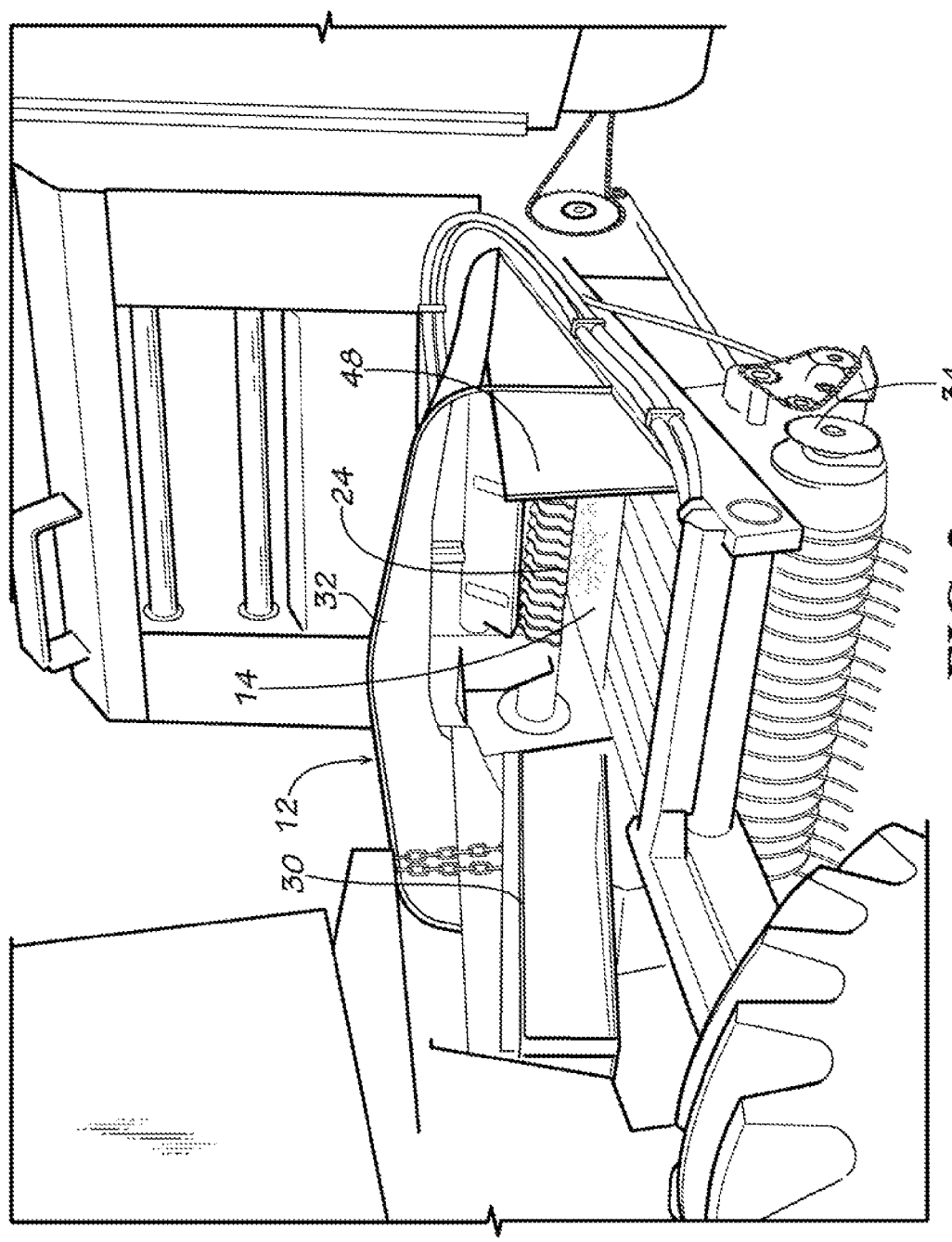
FIG. 3 shows a perspective view of an accumulation windguard.

Turning to the figures where like reference numbers refer to like elements throughout the several views, FIG. 1 shows an example embodiment of a baler 10 having a windguard 12 in which the baler 10 is being pulled by a combine 8. As shown in FIGS. 2 and 3 the windguard 12 may be used for managing airflow over a crop material accumulation area 14. The accumulation area 14 may be a location on a conveyor 20 configured to provide the crop material 22 to an inlet 24 of the baler 10. A pickup 26 may be used to provide crop material from the ground to the conveyor 20. In alternate embodiment, the crop material may be provided by other means such as being projected from a combine 8 to the accumulation area 14 as shown in FIG. 1.

In one example embodiment, the windguard 12 may include deflectors 30 in the form of sidewalls 30 and a cover 32. The sidewalls 30 may be non-porous parallel spaced-apart walls 30 mounted on each side of an accumulation conveyor 20 to deflect transverse airflow across the accumulation area 14. The sidewalls 30 may be mounted to a tongue 34 of the baler 10 and have a height that is sufficient to deflect transverse airflow for an expected height of accumulated crop material 22 on the conveyor 20. As seen in FIG. 1, the tongue 34 may angle forwardly and downwardly from the baler 10 and the sidewalls 30 may have a shaped so as to generally maintain a height relative to the ground. In an example embodiment the sidewalls 30 may be made of sheet metal, but other non-porous material sufficient to limit airflow therethrough may be used.

Figure 4:
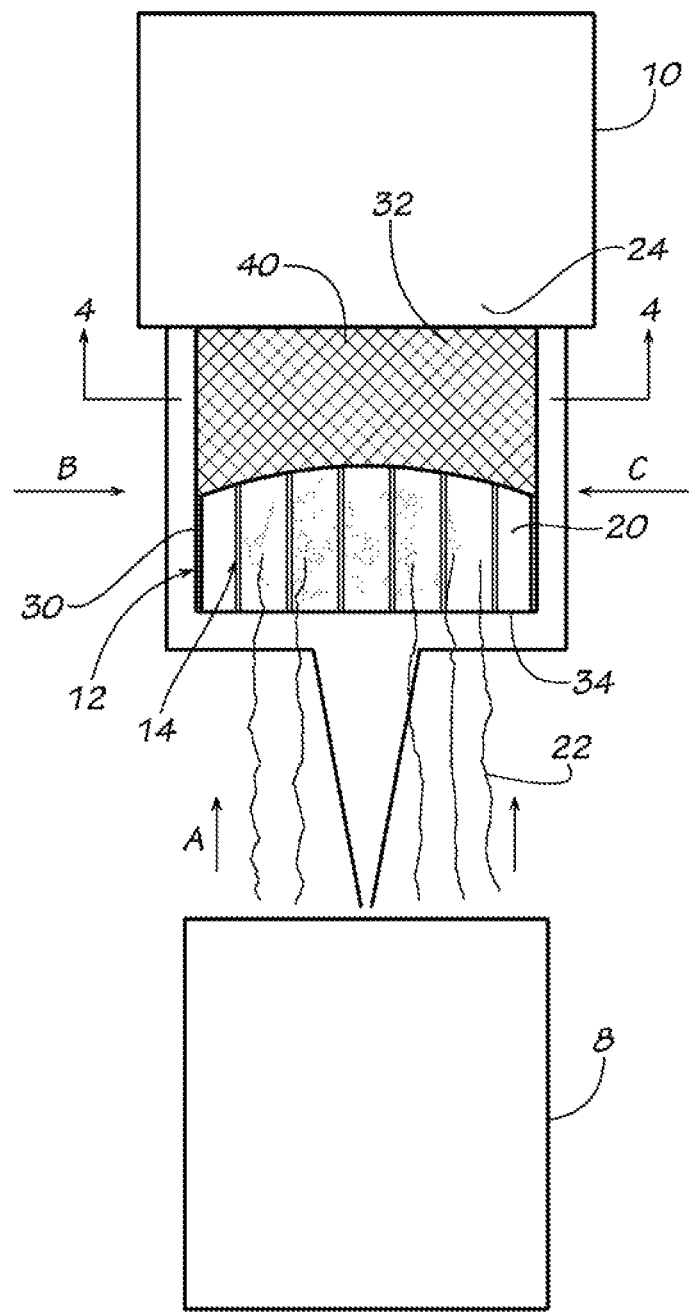
FIG. 4 shows a top view of an accumulation windguard in accordance with an example embodiment of the invention.
Figure 5:
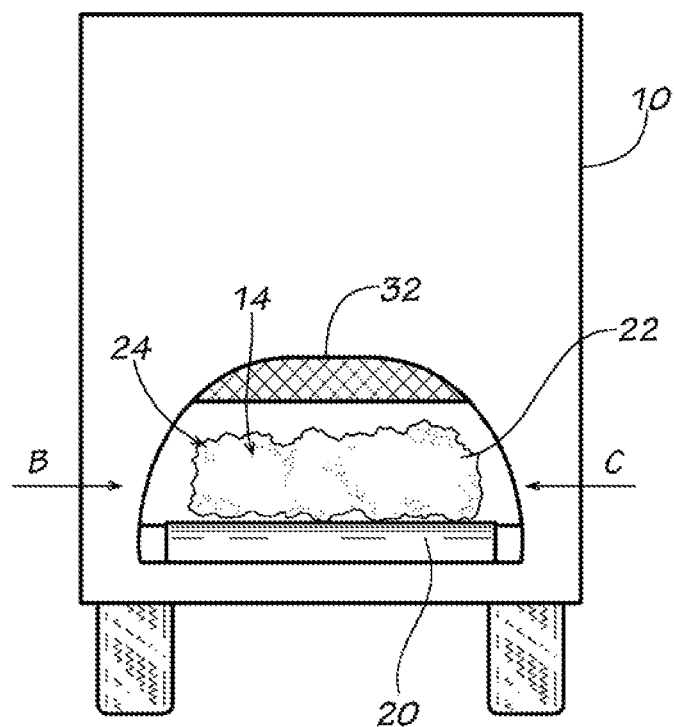
FIG. 5 shows a view of the accumulation windguard along the cut-line 4-4 of FIG. 3
Figure 6:
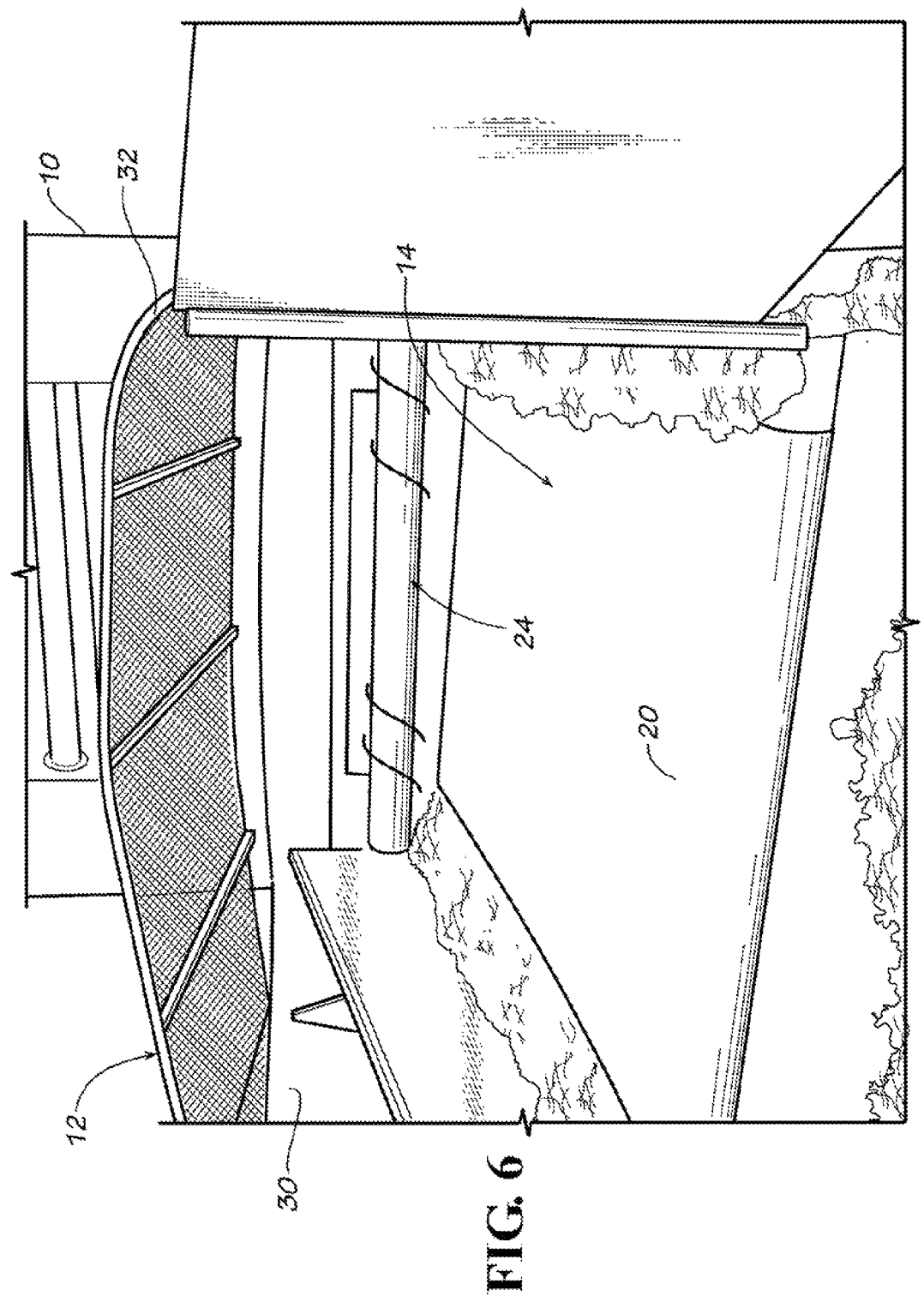
FIG. 6 shows an example embodiment of an accumulation windguard looking toward a feed end of a round baler.

As shown in FIG. 4, the sidewalls 30 may be arranged to prevent transverse airflow, such as crosswinds B, C from affecting an accumulation of crop material 22 in the accumulation area 14. This enables a more even and consistent spreading of the crop material 22 across the accumulation area 14, which in turns leads to production of a more uniform bale rather than the lopsided bale that can result from the gathering of crop material to one side of the conveyor.

The cover 32 may extend between the sidewalls 30 across the accumulation area 14. The cover 32 may be sufficiently porous to allow airflow therethrough. In an example embodiment the cover 32 is in the form of a metal screen having mesh openings 40 of about one square inch. The openings are sufficiently sized to allow airflow therethrough while preventing passage of crop material 22. For example, crop material 22 may be picked up and projected onto the conveyor accumulation area. Airflow from the agricultural vehicle pulling the baler 10 may flow rearwardly to the accumulation area 14 so that the crop material 22 is caught up in the airflow. The cover is configured to allow airflow over the accumulation area and through the cover, and to deflect crop material 22 in the airflow back to the accumulation area 14. In an example embodiment, the cover may be made of a rigid metal screen having a thickness to withstand impact of crop material 22.

The cover may extend forward and be angled upward from an inlet 24 of the baler 10 over the accumulation area 14. The cover 32 may serve as a deflector to deflect airborne crop material 22 downward toward the conveyor 20 while providing sufficient openings 40 to allow the rearward flow of air to pass through. This allows for the crop material 22 to be directed to the accumulation area 14 by the longitudinal airflow without overshooting it.

The sidewalls 30 and cover 32 of the windguard 12 thus serve as a sort of mouth for receiving crop material 22 from a source, such as a combine 42, and also serve as a guide for directing the crop material to the accumulation area 14. The windguard 12 also serves to manage the airflow in a longitudinal direction toward the baler 10 and limit transverse airflow that may adversely affect the accumulated material by urging the crop material toward a side of the conveyor 20.

In one example embodiment the cover 32 may be movably coupled to the baler 10 to allow for different arrangements of the windguard 12. For example, the cover 32 may be hingedly attached to the tongue 34 at a pivot point 44 so that the cover 32 may be rotated through a range of positions. Thus, the accumulation windguard arrangement assists in guiding crop material 22 to the accumulation area 14 by allowing longitudinal airflow along the feed path of the conveyor 20 to carry the crop material rearward toward the baler 10 while limiting the effect of transverse airflow across the accumulation area. The cover 32 may be supported by curved support members 48, 50 that are anchored to the tongue 34.

What is claimed is:

1. A baler for receiving crop material and forming the crop material into bales, the baler comprising:
   a conveyor having an accumulation area for accumulating crop material thereon, the conveyor having lateral edges on either side of the accumulation area, wherein the conveyor provides the crop material to an inlet of the baler;
   a windguard configured to at least partly cover the accumulation area on the conveyor, the windguard comprising,
      a pair of non-porous sidewalls mounted on the baler and extending longitudinally along the lateral edges of the conveyor and arranged to deflect transverse airflow away from the accumulation area so the deflected transverse airflow does not affect the crop material on the conveyor; and
      a porous cover mounted on the baler above the conveyor and extending across the accumulation area, the cover having openings configured to allow longitudinal airflow depositing the crop material along the accumulation area to pass through said openings while the cover blocks a substantial portion of the crop material entrained in said depositing airflow.

2. The baler of claim 1, wherein the cover is configured to deflect airborne material toward the accumulation area.

3. The baler of claim 1, wherein the porous cover comprises a rigid mesh.

4. The baler of claim 1, wherein openings in the cover are around one square inch in size.

5. The baler of claim 1, wherein the windguard is coupled to a tongue of the baler.

6. The baler of claim 1, wherein the cover is curved to extend upward from the sidewalls.

7. The baler of claim 1, wherein the cover extends upward from a baling input area.

8. The baler of claim 1, wherein the cover is angled.

* * * * *